US007952315B2

(12) United States Patent

Park, IV

(10) Patent No.: US 7,952,315 B2

(45) Date of Patent: May 31, 2011

(54) CAM DRIVE SYSTEM FOR AN AUTOMATED MEDICATION CART

(75) Inventor: William C. Park, IV, Charleston, SC (US)

(73) Assignee: Sabal Medical, Inc., Daniel Island, SC (US)

( * ) Notice: Subject to any disclaimer, the term of this patent is extended or adjusted under 35 U.S.C. 154(b) by 359 days.

(21) Appl. No.: 12/350,462

(22) Filed: Jan. 8, 2009

(65) Prior Publication Data

US 2010/0174411 A1 Jul. 8, 2010

(51) Int. Cl.
*G05B 19/33* (2006.01)
*G05B 13/00* (2006.01)

(52) U.S. Cl. ................ 318/578; 318/1; 318/3; 318/558; 700/231; 700/241; 700/275

(58) Field of Classification Search .................. 318/1, 3, 318/280, 578, 558; 700/231, 233, 240, 241, 700/242, 243, 275

See application file for complete search history.

(56) References Cited

U.S. PATENT DOCUMENTS 5,432,412 A * 7/1995 Harris et al. ...................... 318/3
6,098,732 A * 8/2000 Romick et al. .................. 180/23
6,219,587 B1 * 4/2001 Ahlin et al. .................. 700/233
7,689,318 B2 * 3/2010 Draper .......................... 700/236
7,747,347 B2 * 6/2010 Park, IV ........................ 700/243

* cited by examiner

*Primary Examiner* — Walter Benson

*Assistant Examiner* — Thai Dinh

(74) *Attorney, Agent, or Firm* — Marsh Fischmann & Breyfogle LLP

(57) ABSTRACT

The system includes a plurality of vertically spaced medication trays with a base assembly and a motor, responsive to computer commands, mounted on the base assembly. A drive shaft case member extends vertically from the base assembly. A cam assembly includes a plurality of spaced cam members, each cam member having concave portions and lobe portions on a peripheral surface thereof. A first drive clutch selectively engages the motor with both the drive shaft case member and the cam assembly for rotation of both in one direction, while a second drive clutch selectively engages the motor with just the cam assembly for rotation thereof in an opposing direction. The drive shaft case member has a cam follower assembly associated with each cam member, wherein one portion of the cam follower assembly engages the cam element and another portion engages an associated tray when the cam follower engages a selected concave portion on the cam element associated with the tray.

18 Claims, 5 Drawing Sheets

CAM DRIVE SYSTEM FOR AN AUTOMATED MEDICATION CART

TECHNICAL FIELD

This invention relates generally to automated medication carts such as used in hospitals and similar care facilities, and more specifically concerns a drive system for the individual medication trays present in the medication cart.

BACKGROUND OF THE INVENTION

Automated medication carts are generally known, with various configurations and different structural arrangements. One example is shown in U.S. Pat. No. 6,170,929. All automated medication carts require a drive system which, in response to computer commands, presents a compartment in a medication tray containing the medications for a selected patient and/or a selected medication, to a door or port which is accessible to a healthcare professional or other user who administers the medications to the patient.

In operation, these automated carts must be reliable and as fail-safe as possible, i.e. such that only correct medications are available to the healthcare professional for a given patient, eliminating errors in administration of the medications. It is desirable that such a cart have an extended operating life, be easy and convenient to operate and be reasonably priced, with the use of reliable and reasonable cost parts

DISCLOSURE OF THE INVENTION

Accordingly, a drive system for an automated medical cart is disclosed which includes a plurality of vertically spaced medication trays, comprising; a base assembly, including a motor mounting assembly; a motor, having a drive shaft, responsive to control commands, mounted on the motor mounting assembly; a drive shaft case member; a cam assembly which includes a plurality of spaced cam members therealong, each cam member including a tray engaging portion, wherein the cam members are arranged such that the tray engaging portion of each cam member has a unique angular position around the circumference of the cam assembly; a first drive assembly for selectively engaging the motor with the drive shaft case member and the cam assembly, such that rotation of the motor in one rotational direction will rotate both the drive shaft case member and the cam assembly; and a second drive assembly for selectively engaging the motor with the cam assembly, such that rotation of the motor in an opposing rotational direction will rotate just the cam assembly, wherein the drive shaft case member includes a plurality of cam follower assemblies, one for each cam member, each cam follower assembly including one portion which engages an associated cam member, and another portion which engages a tray associated with the cam element, wherein when the one portion engages the cam element, rotation of the motor in the opposing rotational direction results in rotation of the associated engaged tray to a desired angular position.

BEST MODE FOR CARRYING OUT THE INVENTION

Figure 1:
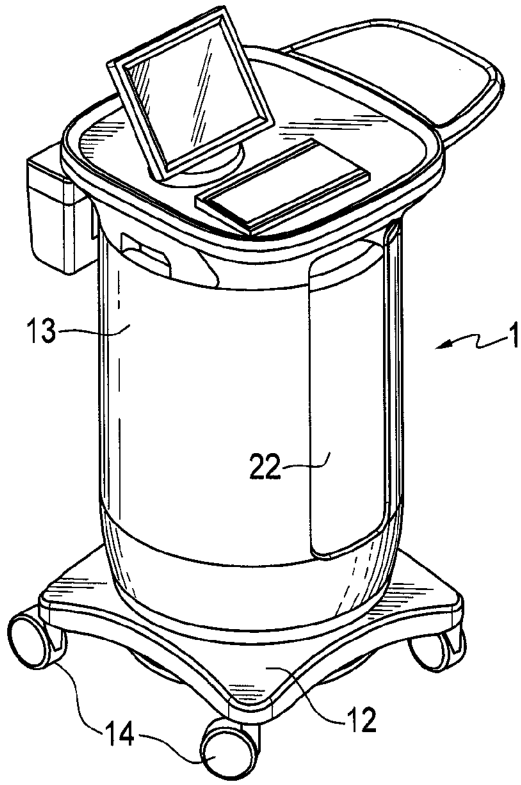
FIG. 1 is a schematic view of the exterior of an automated medication cart.
Figure 2:
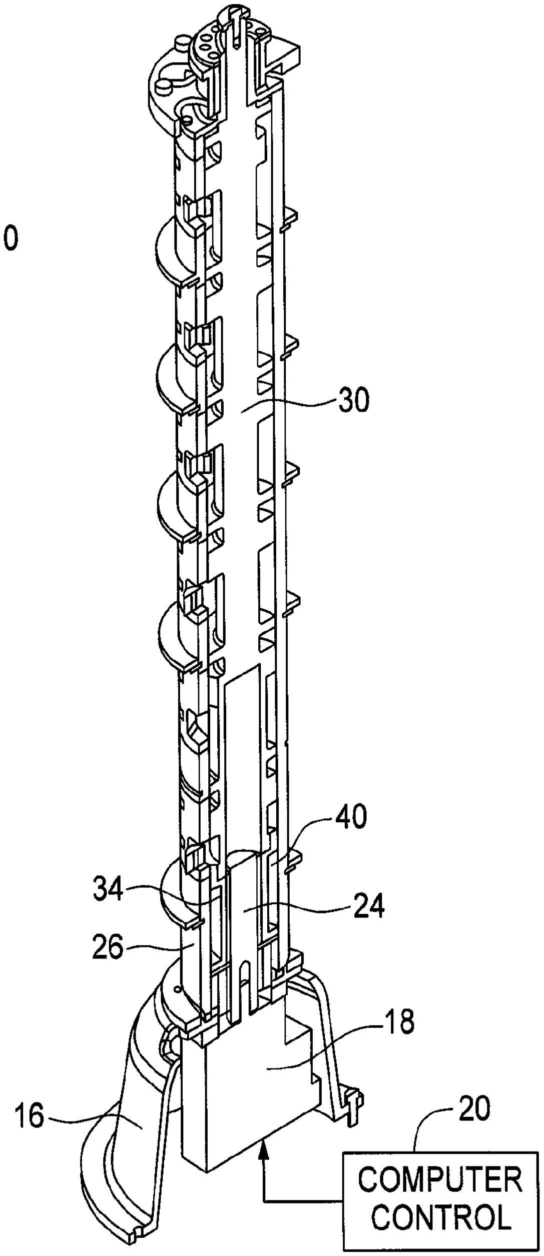
FIG. 2 is a cross-sectional view of the drive system described herein for a medication cart.
Figure 1A:
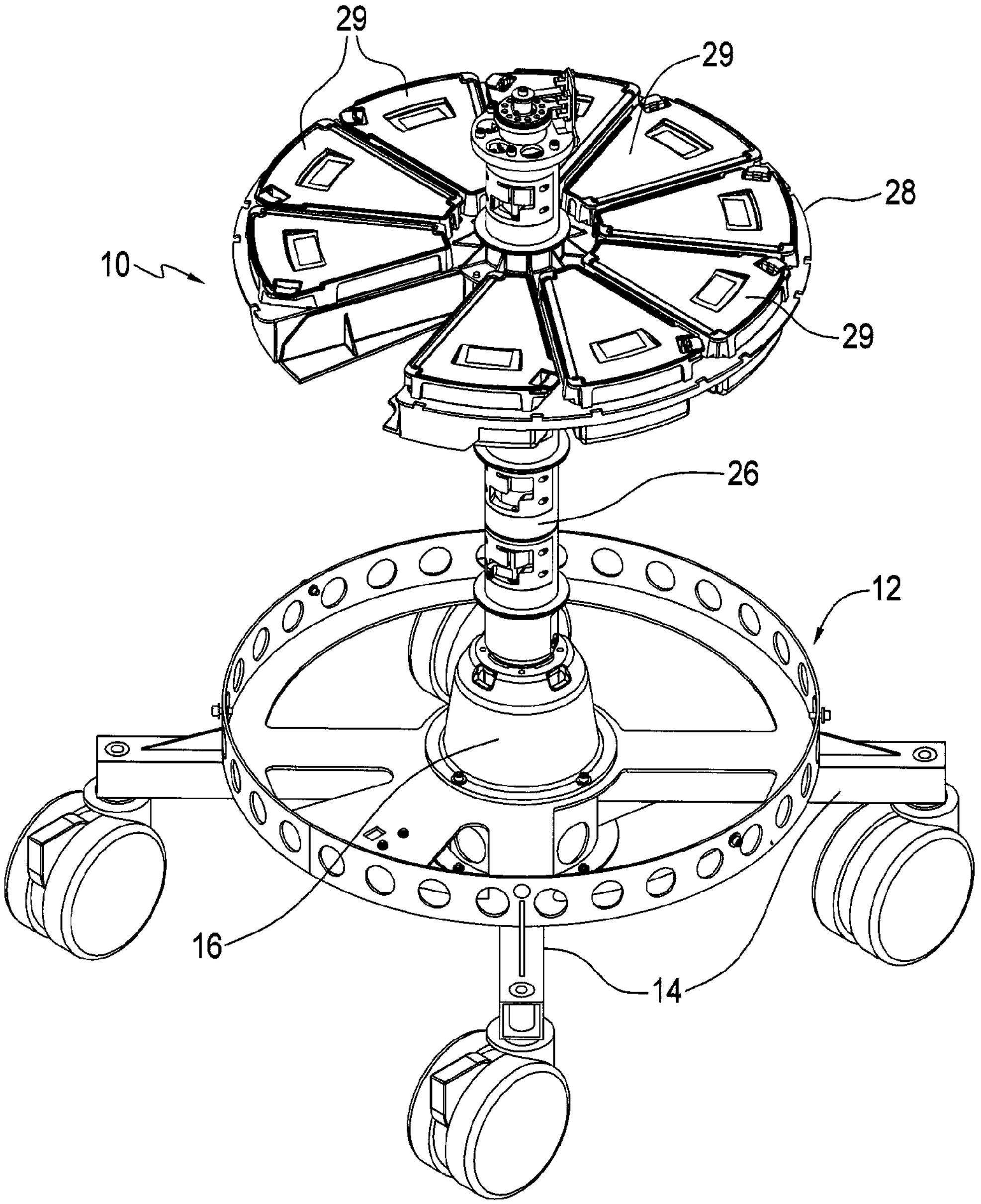
FIG. 1A is a schematic view of an automated medication cart with only a single multi-compartment tray illustrated for clarity.

An automated medication cart is shown generally at 10 in FIGS. 1 and 1A, with FIG. 1A showing the cart with its housing 13 removed. The exterior of cart 10 is explained in more detail in Patent Publication US20070078562, which is owned by the assignee of the present invention, the contents of which are hereby incorporated by reference. The medication cart 10 disclosed herein includes a base assembly 12 which is located at the bottom of the medication cart and is supported off the ground by a wheel assembly 14, which provides a portable capability for the cart. The cart thus can be conveniently moved by a health professional or other user from a docking position to the bedside of a patient and then returned to the docking position. The cart housing will have a door 22 for access to the medications therein.

In the embodiment shown, base assembly 12 is generally circular in configuration, although this can be varied. Secured at the center of base assembly 12 is a motor mount 16. Motor mount 16 is generally cup-like in configuration, with an upside down orientation. Mounted to motor mount 16 is a motor 18 which provides the drive for the cam drive system. The action of the motor, in both clockwise and counterclockwise directions, is controlled by a computer control assembly, shown generally at 20, which is responsive to commands from a user. Computer control 20 is conventional and therefore is not described in detail. It controls the motor in discrete angular steps to provide access to a desired portion of the medication cart, in particular, in the embodiment shown, a single compartment on a particular tray which contains preselected medications for a patient.

A drive shaft 24 extends upwardly from motor 18. A drive shaft case member 26 extends upwardly from motor mount 16 for substantially the full height of the medication cart. Drive shaft case 26 is cylindrical, and in the embodiment shown is made from aluminum. A plurality of medication trays 28-28 are stacked sequentially on the drive shaft case, each tray having a central opening through which the drive shaft case 26 extends. In the medication cart shown, trays 28 are circular in outline, although this could be varied. Positioned in each such tray are a plurality of medication compartments 29, each of which is individually accessible.

In a typical arrangement, therefore, a medication cart 10 will include a plurality of stacked trays (only one tray is shown in FIG. 1), each tray having a plurality of separate compartments, with each compartment having stored therein the medications for a particular patient. The computer control has stored therein the location of the compartment relative to a particular patient. The cart could also include one or more trays used to store selected medications or medical devices not associated with a particular patient. It should be understood that a wide variety of tray/compartment arrangements and configurations can be used in an automated medication cart. The medication trays 28 in the embodiment shown are stacked upon each other as indicated above and as explained below, and rotate only when they are positively connected to the drive shaft case and also released from any locking mechanism associated therewith.

Extending upwardly through drive shaft case 26 is a cam shaft assembly 30. Cam shaft assembly 30 includes a shaft 31 and a plurality of spaced cam members 32-32 positioned in sequence thereon, one cam member for each medication tray in the cart.

The cam drive assembly also includes a lower drive clutch 34 which engages drive shaft 24 with the drive shaft case 26. An upper drive clutch 40 engages drive shaft 24 with cam shaft assembly 30.

When the lower drive clutch 34 is engaged, a clockwise rotation of the motor drive shaft rotates both the drive shaft case and the cam shaft assembly in the clockwise direction. When the upper drive clutch 40 is engaged, a counter clockwise rotation of the motor drive shaft rotates only the cam shaft assembly. The drive shaft case 26 does not move when the drive shaft is rotating counterclockwise.

Figure 3:
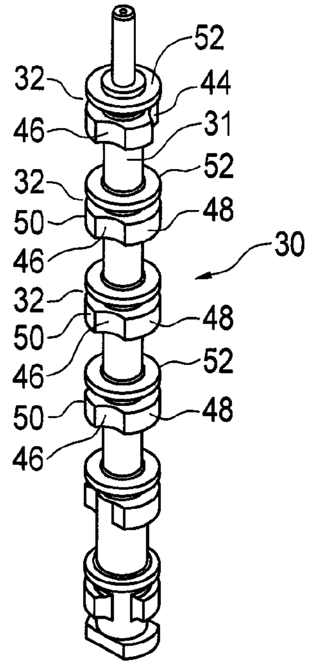
FIG. 3 is a perspective view of a cam shaft portion of the drive system of FIG. 2.

Referring to FIG. 3, cam shaft assembly 30 in the embodiment shown is made from a hard plastic material, such as Delrin®. As indicated above, cam members 32 are spaced along a shaft 31, which in the embodiment shown are integral. Each cam member is generally circular in outline with two concave portions 44 and 46 on the exterior surface, thereby defining curved lobe portions 48 and 50 between them. In the embodiment shown, the cam elements have an exterior diameter of approximately 1⅞ inches, and are approximately ⅝ inch thick. The concave portions 44 and 46 extend for approximately 36° and have a maximum depth of ¼ inch.

The concave portions of the cam members are positioned such that one of the concave portions of the cam members are always in registry along the shaft 32. The second concave portion of the cam members are, respectively, at different angular positions around the peripheries of the cam members, arranged so that none of the second concave portions of the cam members overlap along the shaft, thereby providing a capability of uniquely and individually engaging each tray member in the cart, as described in more detail below. FIG. 3 shows the top cam element 32, with both concave portions visible, while the second concave portions of the remaining cam elements are angularly spaced therefrom and therefore not visible in FIG. 3. Associated with each cam member 32 is a circular spacing member 52. These spacing members are separated from the cam members by approximately ½ inch and are useful for maintaining stability of the cam assembly within the drive shaft case.

Figure 4:
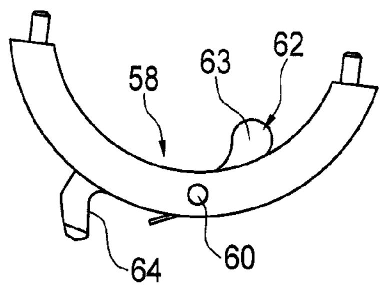
FIG. 4 is a top view of the article of FIG. 3.
Figure 5:
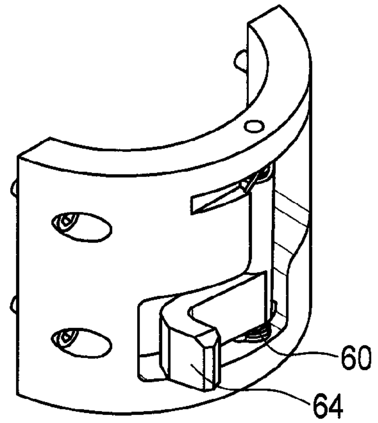
FIG. 5 is a perspective view of a section of a cam follower portion of the drive system of FIG. 2.

A single cam follower module portion of the drive shaft case, associated with a single cam member, is shown in FIGS. 4 and 5. The cam follower structure of FIGS. 4 and 5 which selectively connects the cam shaft to the tray associated with the cam follower is replicated for each cam member along the length of the cam shaft assembly, i.e. there is one cam follower module for each cam member and its associated medication tray in the medication cart.

As stated above, drive shaft case 26 is cylindrical and includes an opening 56 in a wall thereof for each cam member, in which is mounted a cam follower assembly, shown generally at 58. The cam follower assembly 58 is spring-loaded about a vertically-oriented center spring 60. The cam follower assembly 58, which in the embodiment shown is approximately 1¾ inches high and made from metal includes a cam follower element 62 which includes a rounded lobe 63 on one end thereof which extends inwardly of the drive shaft case 26, toward the cam shaft assembly. Lobe 63 in operation contacts the peripheral surface of its associated cam member as the cam assembly is rotated. The spring member 60 forces the lobe 63 against the alternating lobe and concave portions of the cam member as the cam assembly rotates.

At the other end of the cam follower element 62 is a tray hook 64. Tray hook 64 is an elongated hook-shaped member which extends outwardly from drive shaft case 26, as shown in FIGS. 4 and 5. By the action of spring 60, tray hook 64 will move toward and away from, i.e. inwardly and outwardly of, drive shaft case 26, as cam follower element 62 engages the concave and lobe portions of the cam member. When the cam follower element 62 engages the concave portions of its associated cam element, the tray hook will move outwardly, while when the cam follower engages the lobe portions, the tray hook moves inwardly, toward the surface of the drive shaft case.

Figure 6A:
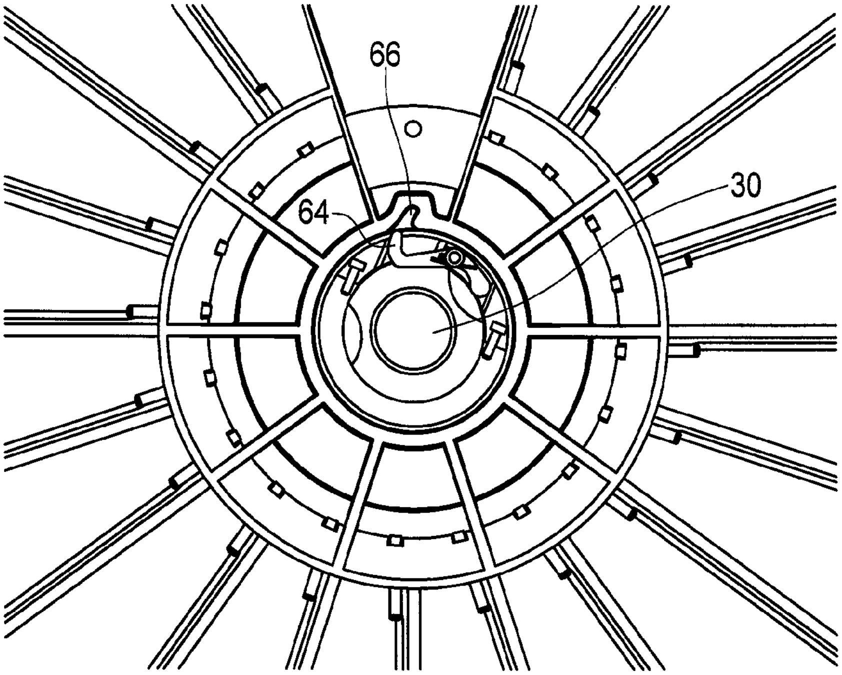
FIGS. 6A and 6B are top views of the drive system of FIG. 2, in combination with a medication tray.
Figure 6B:
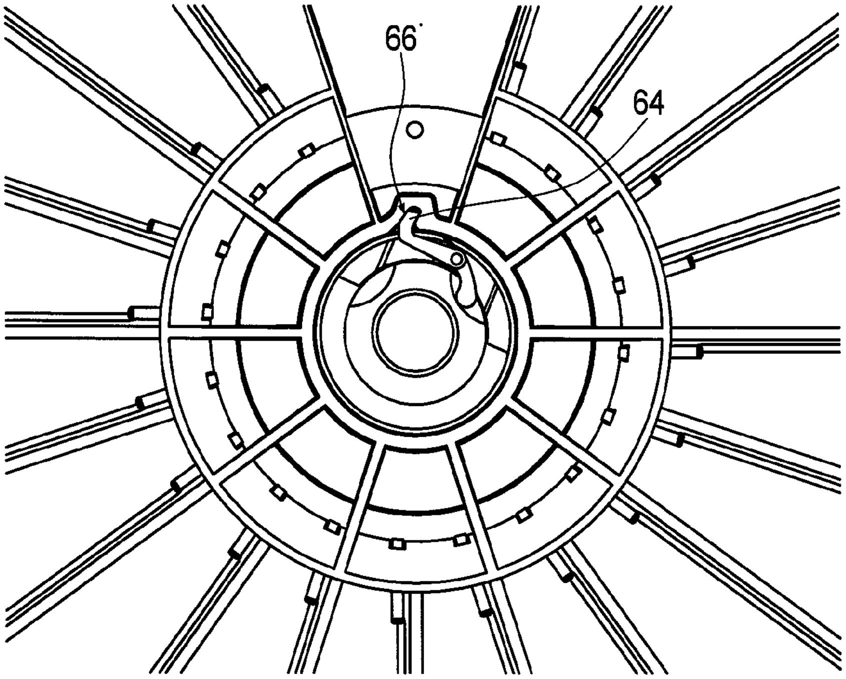

FIG. 6A shows the cam follower assembly when the cam follower element 62 engages the lobe portions of its associated cam member. Tray hook 64 is in its inward position, towards the drive shaft case, and does not engage drive slot 66 in its associated tray. In this position, the tray remains fixed in position, typically by a solenoid or similar locking mechanism located at the edge of the tray. The cam assembly is free to continue to rotate, since the cam followers for all of the tray lock members are riding on lobe portions of their associated cam members. When the cam shaft 30 is rotated to a position where the cam follower of one of the tray lock assemblies engages a concave portion of its associated cam member, the tray hook 64 moves outwardly under the influence of the spring 60, engaging the tray slot in its associated tray, as shown in FIG. 6B. In this position, the particular tray associated with the cam members is now engaged and ready to be rotated. A solenoid or similar means otherwise holding the tray in a fixed position is released, allowing the tray to be rotated by rotation of the cam assembly.

In operation, motor drive shaft 24 rotates clockwise, moving both the drive shaft case 26 and the cam shaft assembly 30. The drive shaft case remains in position. The one tray engaged by its associated tray lock assembly rotates as well to the particular angular position in which the compartment associated with the designated patient can be accessed, such as by the door in the cart housing. After the desired compartment has been presented and accessed and the medication(s) therein removed, the cam drive assembly moves the tray back to its home position. The tray is then locked. The cam shaft assembly is then free to rotate clockwise, which disengages the cam follower from the accessed tray. The cam shaft assembly can then be rotated again to engage a different tray.

Accordingly, through the use of a combination of a particularly configured cam shaft assembly and drive shaft case, with a cam follower assembly associated with each tray, each tray in the medication cart can be uniquely engaged and then rotated to provide access to a selected compartment within that tray. The drive commands for the motor are provided by a computer control unit, receiving instructions if necessary by the user.

Figure 7:
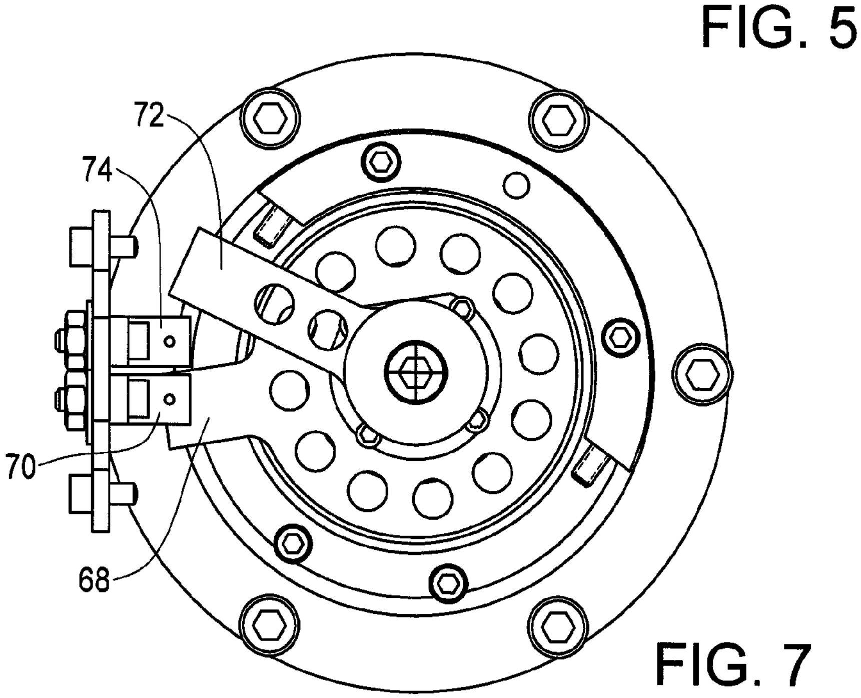
FIG. 7 is a top view of a portion of the homing system for the drive system of FIG. 2.
Figure 8:
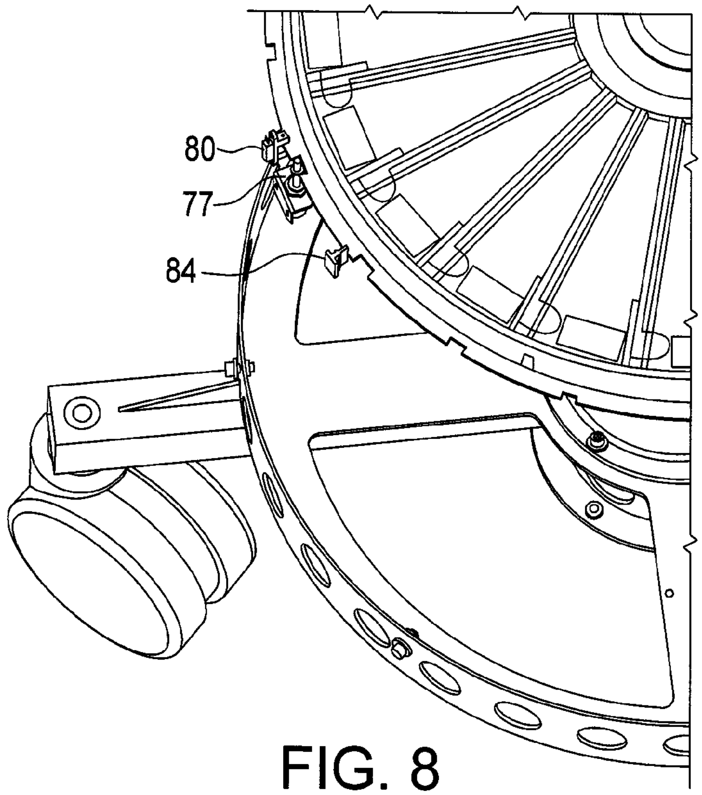
FIGS. 8 and 9 are perspective views showing other portions of the homing system for the drive system of FIG. 2.
Figure 9:
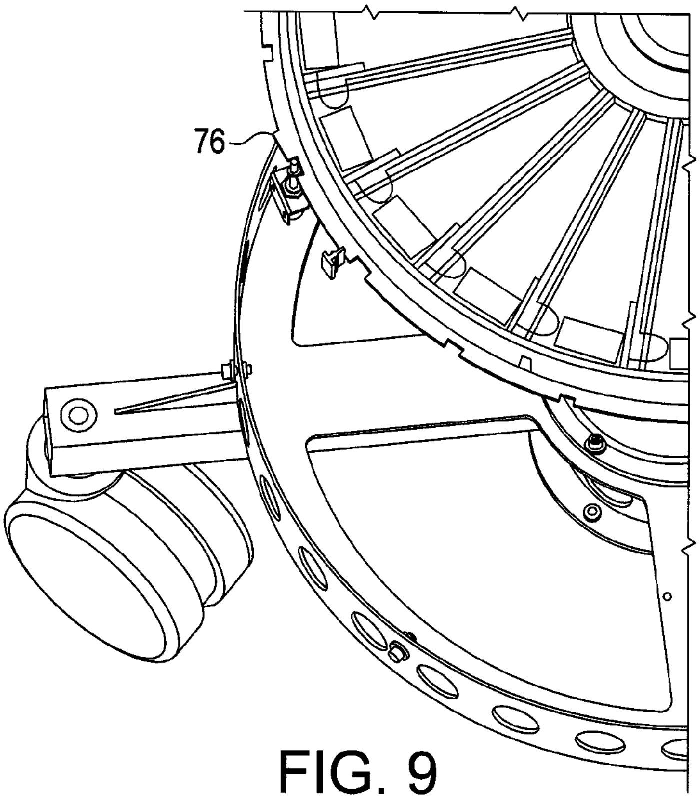

FIGS. 7-9 show the homing sequence mechanism for the cam assembly. The homing and initialization process uses a first sensor flag member 68 which is attached to and extends outwardly from the cam shaft near the top thereof. A second sensor flag member 72 is secured to the drive shaft case 26 near the top thereof and rotates therewith. In the homing sequence, the drive shaft case and the cam shaft are first rotated clockwise by the motor until the sensor flag member 68 activates (blocks) sensor 70 which is mounted to a bracket that is fastened to the top surface of the cart. Cam shaft assembly 30 is then rotated counterclockwise by the motor, with drive shaft case 26 remaining stationary, until the sensor flag member 72 activates (blocks) sensor 74, which is adjacent sensor 70.

Each tray has a tray home sensor flag element 76 and an associated tray home sensor 80 (FIGS. 8 and 9) that is mounted to the side of the cart. All the tray home sensors are checked. If a particular tray is not in its home position, the cam shaft assembly 30 is rotated to the engagement position with that tray. The tray is then unlocked by actuating the tray lock solenoid 77.

Next, the motor is rotated in the clockwise direction, with the upper clutch engaged, so that both the cam shaft assembly 30 and the drive shaft case 26 turn together. The tray will contact a drag flag member 84, which is also mounted on the side of the cart, located just prior to the tray home sensor 80, allowing the tray hook for the tray to catch up to and engage the drive slot in the tray. The drag flag member 84 prevents the tray from turning while the shaft is turning without the hook being engaged.

Once the tray hook engages the drive slot in the tray, further clockwise rotation of the drive shaft case will move the tray a few additional degrees clockwise, to the point where the tray home sensor flag element 76 aligns with and blocks the tray home sensor 80. At this point, the tray is in its home position. The computer control recognizes that the tray is in its home position because of the condition of the sensor system for that tray. The tray is then locked by the tray solenoid.

At this point, both the cam shaft and the drive shaft case are rotated clockwise until flag 68 blocks sensor 70. The cam shaft assembly is then rotated counterclockwise until the flag 72 blocks sensor 74.

The above process is repeated for any additional trays which are not in their home position.

Accordingly, a cam drive assembly has been disclosed which is capable of engaging and driving each tray in a medication cart individually. After the desired tray has been engaged, in response to a computer command, the tray is rotated to bring a selected compartment of the tray into an accessible position for the user. The cam drive assembly also includes elements for ensuring that the cam drive assembly and the individual trays are returnable to a home position.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A drive system for an automated medication cart which includes a plurality of vertically spaced medication trays, comprising;

- a base assembly, including a motor mounting assembly;
- a motor, having a drive shaft, responsive to control commands, mounted on the motor mounting assembly;
- a drive shaft case member;
- a cam assembly which includes a plurality of spaced cam members therealong, each cam member including a tray engaging portion, wherein the cam members are arranged such that the tray engaging portion of each cam member has a unique angular position around the circumference of the cam assembly;
- a first drive assembly for selectively engaging the motor with the drive shaft case member and the cam assembly, such that rotation of the motor in one rotational direction will rotate both the drive shaft case member and the cam assembly;
- and a second drive assembly for selectively engaging the motor with the cam assembly, such that rotation of the motor in an opposing rotational direction will rotate just the cam assembly, wherein the drive shaft case member includes a plurality of cam follower assemblies, one for each cam member, each cam follower assembly including one portion which engages an associated cam member, and another portion which engages a tray associated with the cam element, wherein when the one portion engages the cam element, rotation of the motor in the opposing rotational direction results in rotation of the associated engaged tray to a desired angular position.

2. The drive system of claim 1, wherein the drive shaft case member is a cylinder having a wall, and wherein the cam follower assemblies are located in openings in the wall of the cylinder, wherein in operation the one portion extends inwardly of the drive shaft case member and wherein the other portion extends outwardly to engage the associated tray.

3. The drive system of claim 2, wherein the cam follower assembly is spring-loaded, and wherein the other portion is hook-shaped, to engage a corresponding slot in the associated tray when the one portion engages the tray engaging portion of the cam element.

4. The drive system of claim 3, wherein the tray engaging portion is concavely shaped.

5. The drive system of claim 4, wherein the concave portion extends for approximately 36.degree. of the periphery of the cam element.

6. The drive system of claim 4, wherein all of the cam elements include a second concave portion which are in registry along the cam assembly.

7. The drive system of claim 1, including a circular spacer element positioned adjacent each cam element.

8. The drive assembly of claim 1, wherein the control commands are produced by a computer.

9. The drive system of claim 1, including a solenoid assembly for selectively locking and unlocking each medication tray, in response to a computer-generated command.

10. The drive system of claim 1, including sensors and associated sensor flags for locating the cam assembly and the drive shaft case in a home position.

11. The drive system of claim 1, including a medication tray sensor system for rotating each medication tray in a home position.

12. An automated portable medication cart, comprising:

- a housing;
- a drive system for a plurality of vertically spaced medication trays, supported within the housing the drive system, comprising:
- a base assembly, including a motor mounting assembly and a wheel assembly which permits the cart to be moved about;
- a motor, having a drive shaft, responsive to control commands, mounted on the motor mounting assembly;
- a drive shaft case member;
- a cam assembly which includes a plurality of spaced cam members therealong, each cam member including a tray engaging portion, wherein the cam members are arranged such that the tray engaging portion of each cam member has a unique angular position around the circumference of the cam assembly;
- a first drive assembly for selectively engaging the motor with the drive shaft case member and the cam assembly, such that rotation of the motor in one rotational direction will rotate both the drive shaft case member and the cam assembly;

and a second drive assembly for selectively engaging the motor with the cam assembly, such that rotation of the motor in an opposing rotational direction will rotate just the cam assembly, wherein the drive shaft case member includes a plurality of cam follower assemblies, one for each cam member, each cam follower assembly including one portion which engages an associated cam member, and another portion which engages a tray associated with the cam element, wherein when the one portion engages the cam element, rotation of the motor in the opposing rotational direction results in rotation of the associated engaged tray to a desired angular position.

13. The medication cart of claim 12, wherein the drive shaft case member is a cylinder having a wall, and wherein the cam follower assemblies are located in openings in the wall of the cylinder, wherein in operation the one portion extends inwardly of the drive shaft case member and wherein the other portion extends outwardly to engage the associated tray.

14. The medication cart of claim 13, wherein the cam follower assembly is spring-loaded, and wherein the other portion is hook-shaped, to engage a corresponding slot in the associated tray when the one portion engages the tray engaging portion of the cam element.

15. The medication cart of claim 12, wherein the control commands are produced by a computer.

16. The medication cart of claim 12, including a solenoid assembly for selectively locking and unlocking each medication tray, in response to a computer-generated command.

17. The medication cart of claim 12, including sensors and associated sensor flags for locating the cam assembly and the drive shaft case in a home position.

18. The medication cart of claim 12, including a medication tray sensor system for rotating each medication tray in a home position.

* * * * *